US008699189B2

(12) United States Patent
Smith et al.

(10) Patent No.: US 8,699,189 B2
(45) Date of Patent: Apr. 15, 2014

(54) HIGH PRECISION CLIPPING REGULATOR CIRCUIT

(75) Inventors: Douglas Edward Smith, Phoenix, AZ (US); Paul Schwerman, Phoenix, AZ (US); Leigh Pelton, Peoria, AZ (US); Bruce Rogers, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 135 days.

(21) Appl. No.: 13/477,615

(22) Filed: May 22, 2012

(65) Prior Publication Data

US 2013/0314833 A1 Nov. 28, 2013

(51) Int. Cl.
*H02H 7/00* (2006.01)

(52) U.S. Cl.
USPC .......... 361/18

(58) Field of Classification Search
USPC .......... 361/18
See application file for complete search history.

(56) References Cited

U.S. PATENT DOCUMENTS 4,684,876 A * 8/1987 Creel .......... 323/268
RE33,076 E * 10/1989 Sugiura .......... 73/204.15
4,943,739 A 7/1990 Slaughter
4,948,989 A * 8/1990 Spratt .......... 327/513
5,222,010 A 6/1993 Capan
5,357,156 A 10/1994 Herrington
5,615,074 A 3/1997 Avery
5,940,259 A 8/1999 Robinson
5,978,192 A 11/1999 Young et al.
6,331,763 B1 12/2001 Thomas et al.
6,426,854 B1 7/2002 Allen
7,027,278 B1 4/2006 Vashchenko et al.
7,130,175 B2 10/2006 Dietz et al.
2006/0215439 A1 * 9/2006 Bill et al. .......... 365/148
2006/0250732 A1 11/2006 Peachey
2007/0058437 A1 * 3/2007 Schaffer .......... 365/185.23
2009/0024349 A1 * 1/2009 Boerstler et al. .......... 702/132
2009/0086395 A1 4/2009 Skrenes et al.
2013/0027117 A1 * 1/2013 Dorfan .......... 327/513

OTHER PUBLICATIONS

EP Search Report for Application No. 13 158 433.6 dated Sep. 2, 2013.

Paulkovich, J.; Solar Array Regulators of Explorer Satellites XII, XIV, XV, XVIII, XXI, XXXVI, XXVIII, and ARIEL1; NASA Technical Note, NASA TN D-3983, National Aeronautics and Space Administration, Washington, D.C. Jul. 1967.

Newman, W.H.; Radiation Hardened Power Electronics, Intersil Corporation.

EP Examination Report for Application No. 13 158 433.6 dated Sep. 23, 2013.

* cited by examiner

*Primary Examiner* — Scott Bauer
(74) *Attorney, Agent, or Firm* — Ingrassia Fisher & Lorenz, P.C.

(57) ABSTRACT

A high precision clipping regulator circuit includes a first protection diode, a second protection diode, a first offset clamp voltage regulator, and a second offset clamp voltage regulator. The first protection diode is configured to conduct when a voltage potential exceeds a first protection voltage magnitude, and is operable to exhibit variations in the first protection voltage magnitude. The second protection diode is configured to conduct when a voltage potential exceeds a second protection voltage magnitude, and is operable to exhibit variations in the second protection voltage magnitude. The first reference and second voltage regulator circuits are configured to determine when the first and second protection voltages vary and, in response thereto, to vary the first and second variable offset clamp voltages so that a difference in voltage across the protection diodes remains substantially constant.

15 Claims, 2 Drawing Sheets

HIGH PRECISION CLIPPING REGULATOR CIRCUIT

STATEMENT REGARDING FEDERALLY SPONSORED RESEARCH OR DEVELOPMENT

This invention was made with Government support under Honeywell Sub-contract # R008. The outside funding name is restricted. The Government has certain rights in the invention.

TECHNICAL FIELD

The present invention generally relates to overvoltage protection circuits, and more particularly relates to a high precision clipping regulator circuit for providing overvoltage protection for inputs to integrated circuit like analog to digital converters.

BACKGROUND

Many electronic systems, such as those installed in space vehicles, need to exhibit high accuracy and performance. At the same time, these electronic systems need to be protected against postulated worst-case signal scenarios with the parts in the circuit simultaneously performing at the worst case datasheet levels. Unfortunately, as the accuracy and performance of some electronic systems is improved, the sensitivity of these electronic systems to these postulated worst-case scenarios increases. Although numerous circuits have been designed and developed to protect electronic systems from these postulated worst-case scenarios, none provide suitable protection while allowing the electronic systems to operate at maximum precision.

Hence, there is a need for a protection circuit and method that protects highly accurate electronic systems from various postulated worst-case scenarios, while simultaneously allowing the electronic systems to operate at maximum precision. The present invention meets at least this need.

BRIEF SUMMARY

In one embodiment, a high precision clipping regulator circuit includes a first protection diode, a second protection diode, a first offset clamp voltage regulator, and a second offset clamp voltage regulator. The first protection diode has a first anode and a first cathode, is configured to conduct when a voltage potential between the first anode and first cathode exceeds a first protection voltage magnitude, and is operable to exhibit variations in the first protection voltage magnitude. The second protection diode has a second anode connected to the first cathode to define a protection node and a second cathode. The second protection diode is configured to conduct when the voltage potential between the second anode and the second cathode exceeds a second protection voltage magnitude, and is operable to exhibit variations in the second protection voltage magnitude. The first offset clamp voltage regulator circuit is coupled to the first anode and is configured to supply a first variable offset clamp voltage thereto. The first offset clamp voltage regulator circuit is configured to determine when the first protection voltage varies and, in response thereto, to vary the first variable offset clamp voltage so that a difference in voltage between the first anode and the protection node, when the first protection diode conducts, remains substantially constant. The second offset clamp voltage regulator circuit is coupled to the second cathode and is configured to supply a second variable offset clamp voltage thereto. The second offset clamp voltage regulator circuit is configured to determine when the second protection voltage varies and, in response thereto, to vary the second variable offset clamp voltage so that a difference in voltage between the second cathode and the protection node, when the second protection diode conducts, remains substantially constant.

In another embodiment, a method of providing precision protection to a circuit includes electrically connecting a first protection diode and a second protection diode to an input of the circuit. The first protection diode has a first anode and a first cathode, with the first cathode connected to the input of the circuit. The first protection diode is configured to conduct when a voltage potential between the first anode and first cathode exceeds a first protection voltage magnitude, and is operable to exhibit variations in the first protection voltage magnitude. The second protection diode has a second anode and a second cathode, with the second anode connected to the input of the circuit. The second protection diode is configured to conduct when a voltage potential between the second anode and second cathode exceeds a second protection voltage magnitude, and is operable to exhibit variations in the second protection voltage magnitude. A first variable offset clamp voltage is supplied to the first anode, and a second variable offset clamp voltage is supplied to the second cathode. A determination is made as to when the first protection voltage varies and, in response thereto, the first variable offset clamp voltage is varied so that a difference in voltage between the first anode and the input of the circuit, when the first protection diode conducts, remains substantially constant. A determination is made as to when the second protection voltage varies and, in response thereto, the second variable offset clamp voltage is varied so that a difference in voltage between the second cathode and the input of the circuit, when the second protection diode conducts, remains substantially constant.

In yet another embodiment, a high precision clipping regulator circuit includes a first protection zener diode, a second protection zener diode, a first offset clamp voltage regulator circuit, and a second offset clamp voltage regulator circuit. The first protection zener diode has a first anode and a first cathode, is configured to conduct when a voltage potential between the first anode and first cathode exceeds a first protection voltage magnitude, and is operable to exhibit variations in the first protection voltage magnitude. The second protection zener diode has a second anode connected to the first cathode to define a protection node, and a second cathode. The second protection zener diode is configured to conduct when the voltage potential between the second anode and the second cathode exceeds a second protection voltage magnitude, and is operable to exhibit variations in the second protection voltage magnitude. The first offset clamp voltage regulator circuit is coupled to the first anode and includes a first reference zener diode, a first constant current source, and a first voltage regulator circuit. The first reference zener diode is substantially identical to the first protection zener diode and has a third anode and a third cathode. The first reference zener diode is configured to conduct when a voltage potential between the third anode and third cathode exceeds the first protection voltage magnitude, and is operable to exhibit variations in the first protection voltage magnitude substantially identical to those of the first protection zener diode. The first constant current source is coupled to the third cathode and is configured to supply a constant current through the first reference zener diode. The first voltage regulator circuit is coupled to the third cathode and is configured to supply the first variable offset clamp voltage, sense variations in the first protection voltage magnitude, and vary the first variable offset clamp voltage in response to sensed variations in the first protection voltage magnitude so that a difference in voltage between the first anode and the protection node, when the first protection zener diode conducts, remains substantially constant. The second offset clamp voltage regulator circuit is coupled to the second cathode and includes a second reference zener diode, a second constant current source, and a second voltage regulator circuit. The second reference zener diode is substantially identical to the second protection zener diode and has a fourth anode and a fourth cathode. The second reference zener diode is configured to conduct when a voltage potential between the fourth anode and fourth cathode exceeds the second protection voltage magnitude, and is operable to exhibit variations in the second protection voltage magnitude substantially identical to those of the first protection zener diode. The second constant current source is coupled to the fourth anode and is configured to supply a constant current through the second reference zener diode. The second voltage regulator circuit is coupled to the fourth anode and is configured to supply the second variable offset clamp voltage, sense variations in the second protection voltage magnitude, and vary the second variable offset clamp voltage in response to sensed variations in the second protection voltage magnitude so that a difference in voltage between the second cathode and the protection node, when the second protection diode conducts, remains substantially constant.

Furthermore, other desirable features and characteristics of the circuit and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
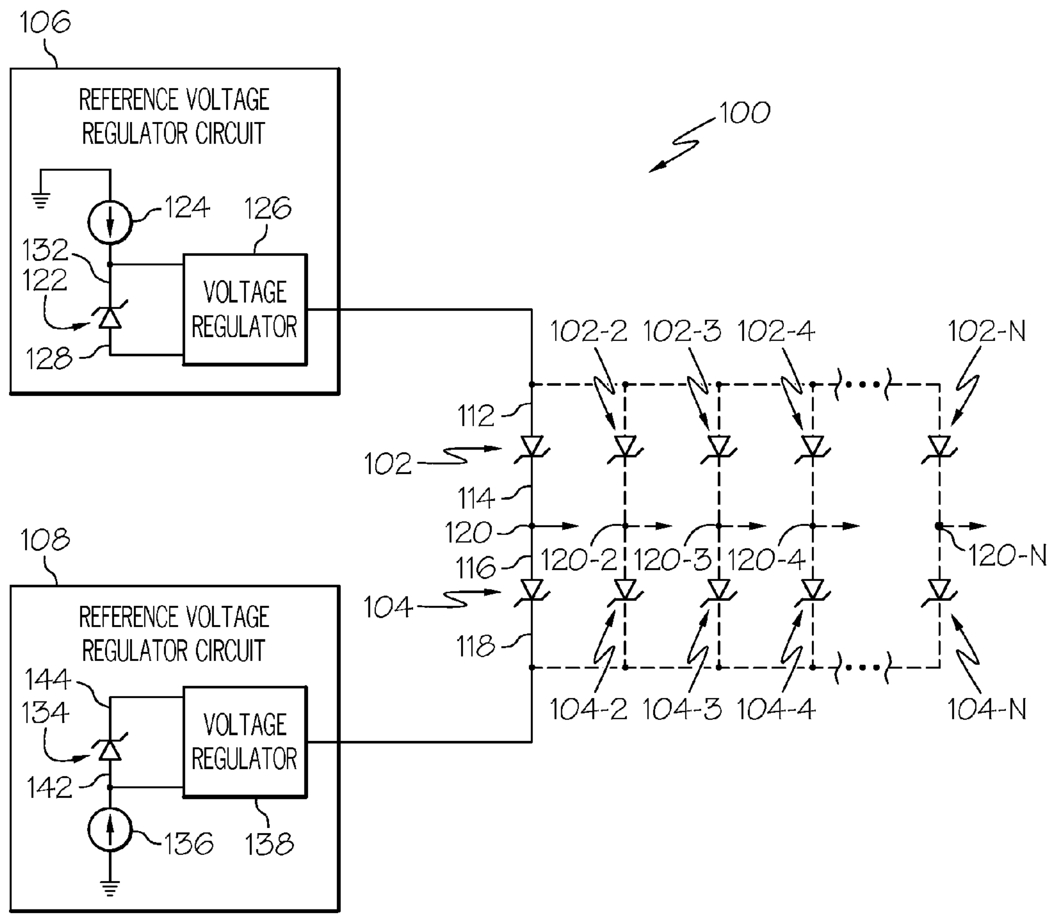
FIG. 1 depicts a functional block diagram of one embodiment of a high precision clipping regulator circuit.

Referring first to FIG. 1, a functional block diagram of one embodiment of a high precision clipping regulator circuit 100 is depicted and includes a first protection diode 102, a second protection diode 104, a first offset clamp voltage regulator circuit 106, and a second offset clamp voltage regulator circuit 108. The first protection diode 102 includes a first anode 112 and a first cathode 114, and is configured to conduct when a voltage potential between the first anode 112 and first cathode 114 exceeds a first protection voltage magnitude. The second protection diode 104 includes a second anode 116 and a second cathode 118, and is configured to conduct when the voltage potential between the second anode 116 and the second cathode 118 exceeds a second protection voltage magnitude. The specific values of the first and second protection voltage magnitudes may vary, and may be selected based on the specific voltages the circuit 100 is protecting against. In one particular embodiment, in which the first and second protection diodes 102, 104 are implemented using zener diodes (which conduct in reverse), the first and second protection voltage magnitudes are each nominally 6.8 volts DC, and each conducts when the voltage at its cathode 114, 118 is higher than the voltage at its respective anode 112, 116. It will be appreciated that in other embodiments, the first and second protection diodes 102, 104 may be implemented using conventional diodes, various other two-terminal regulator devices, or various other shunt regulator circuits.

The first and second protection diodes 102, 104 are connected in series such that the first cathode 114 is connected to the second anode 116 to define a protection node 120. The protection node 120 may be connected to an input of a circuit to provide overvoltage protection for the circuit. For example, in some embodiments the protection node 120 may be connected to an input channel of an analog-to-digital converter (ADC) circuit. For such embodiments, the circuit 100 may additionally include a plurality of additional first protection diodes 102-2, 102-3, 102-4 . . . 102-N, and a plurality of additional second diodes 104-2, 104-3, 104-4 . . . 104-N. Each additional first diode 102-2, 102-3, 102-4 . . . 102-N will also include a first anode 112 and a first cathode 114, and each will be configured to conduct when a voltage potential between its first anode 112 and first cathode 114 exceeds the first protection voltage magnitude. Similarly, each additional second diode 104-2, 104-3, 104-4 . . . 104-N will also include a second anode 116 and a second cathode 118, and each will be configured to conduct when a voltage potential between its second anode 116 and second cathode 118 exceeds the second protection voltage magnitude. Moreover, each of the first cathodes 114 of each of the additional first protection diodes 102-2, 102-3, 102-4 . . . 102-N is connected to the second anode 116 of a different one of the additional second protection diodes 104-2, 104-3, 104-4 . . . 104-N to define a plurality of additional protection nodes 120-2, 120-3, 120-4 . . . 120-N. Each of the additional protection nodes 120-2, 120-3, 120-4 . . . 120-N is preferably connected to a seperate input channel of the analog-to-digital converter (ADC) circuit.

No matter the number of first and second protection diodes 102, 104, each of the first and second protection diodes 102, 104 is operable to exhibit variations in the first and second protection voltage magnitudes, respectively. More specifically, although the first and second protections diodes 102, 104 are designed and manufactured to exhibit nominal first and second protection voltages, respectively, these voltage magnitudes may vary with, for example, temperature, age, and radiation exposure, just to name a few. These variations in first and second protection voltage magnitudes are compensated for via the first and second offset clamp voltage regulator circuits 106, 108.

The first offset clamp voltage regulator circuit 106 is coupled to, and is configured to supply a first variable offset clamp voltage to, the first anode 112, and the second offset clamp voltage regulator circuit 108 is coupled to, and is configured to supply a second variable offset clamp voltage to, the second cathode 118. More specifically, the first offset clamp voltage regulator circuit 106 is configured to determine when the first protection voltage magnitude varies and, in response thereto, varies the first variable offset clamp voltage. The variation in the first variable offset clamp voltage ensures that, when the first protection diode 102 conducts, the difference in voltage between the first anode 112 and the protection node 120 remains substantially constant. Similarly, the second offset clamp voltage regulator circuit 108 is configured to determine when the second protection voltage magnitude varies and, in response thereto, varies the second variable offset clamp voltage. The variation in the second variable offset clamp voltage ensures that, when the second protection diode 104 conducts, the difference in voltage between the second anode 116 and the protection node 120 remains substantially constant. It will be appreciated that the magnitude and relative polarity of the first and second variable offset clamp voltages may vary. It may be readily apparent to the skilled artisan that in the depicted embodiment, the first variable offset clamp voltage will be a negative voltage and the second variable offset clamp voltage will be a positive voltage.

Before proceeding further, it is noted that if the variations of the first and second protection voltage magnitudes were not accounted for, various postulated events, such as over-voltage faults, component temperature variations, and radiation induced transients would not allow the circuit being protected to operate at maximum performance. The depicted high precision clipping regulator circuit 100 is configured to accurately handle such postulated events to prevent exceeding a damage threshold of as little as a few tenths of a volt.

The first and second offset clamp voltage regulator circuits 106, 108 may be variously configured to implement the above-described functionality. In the depicted embodiment, it is seen that each includes a reference diode, a constant current source, and a offset clamp voltage regulator. More specifically, the first offset clamp voltage regulator circuit 106 includes a first reference diode 122, a first constant current source 124, and a first offset clamp voltage regulator 126. The first reference diode 122 is substantially identical to the first protection diode 102, and includes a third anode 128 and a third cathode 132. Because the first reference diode 122 is substantially identical to the first protection diode 102, it too is configured to conduct when the voltage potential between the third anode 128 and third cathode 132 exceeds the first protection voltage magnitude. Moreover, the first reference diode 122 is operable to exhibit variations in the first protection voltage magnitude substantially identical to those of the first protection diode 102. As with the first protection diode 102, the first reference diode 122 may also be implemented using a zener diode or a conventional diode.

The first constant current source 124 coupled to the third cathode 132 and is configured to supply a constant current through the first reference diode 122. This, among other things, ensures that any variations in the first protection voltage magnitude of the first reference diode 122 are not due to variations in current flow through the first reference diode 122.

The first voltage regulator circuit 126 is coupled to the third anode 128 and the third cathode 132 and is configured to supply the first variable offset clamp voltage to the first anode 112. The first voltage regulator circuit 126 is additionally configured to sense variations in the first protection voltage magnitude, and vary the first variable offset clamp voltage in response to the sensed variations in the first protection voltage magnitude.

The second offset clamp voltage regulator circuit 108 is basically a mirror image of the first offset clamp voltage regulator circuit 106, and includes a second reference diode 134, a second constant current source 136, and a second offset clamp voltage regulator 138. The second reference diode 134 is substantially identical to the second protection diode 104, and includes a fourth anode 142 and a fourth cathode 144. Because the second reference diode 134 is substantially identical to the second protection diode 104, it too is configured to conduct when the voltage potential between the fourth anode 142 and fourth cathode 144 exceeds the second protection voltage magnitude. Moreover, the second reference diode 134 is operable to exhibit variations in the second protection voltage magnitude substantially identical to those of the second protection diode 104. As with the second protection diode 104, the second reference diode 134 may also be implemented using a zener diode or a conventional diode.

The first constant current source 136 coupled to the fourth anode 142 and is configured to supply a constant current through the second reference diode 134. This, among other things, ensures that any variations in the second protection voltage magnitude of the second reference diode 134 are not due to variations in current flow through the second reference diode 134.

The second voltage regulator circuit 138 is coupled to the fourth anode 142 and the fourth cathode 144 and is configured to supply the second variable offset clamp voltage to the second cathode 118. The second voltage regulator circuit 138 is additionally configured to sense variations in the first protection voltage magnitude, and vary the first variable offset clamp voltage in response to the sensed variations in the first protection voltage magnitude.

Figure 2:
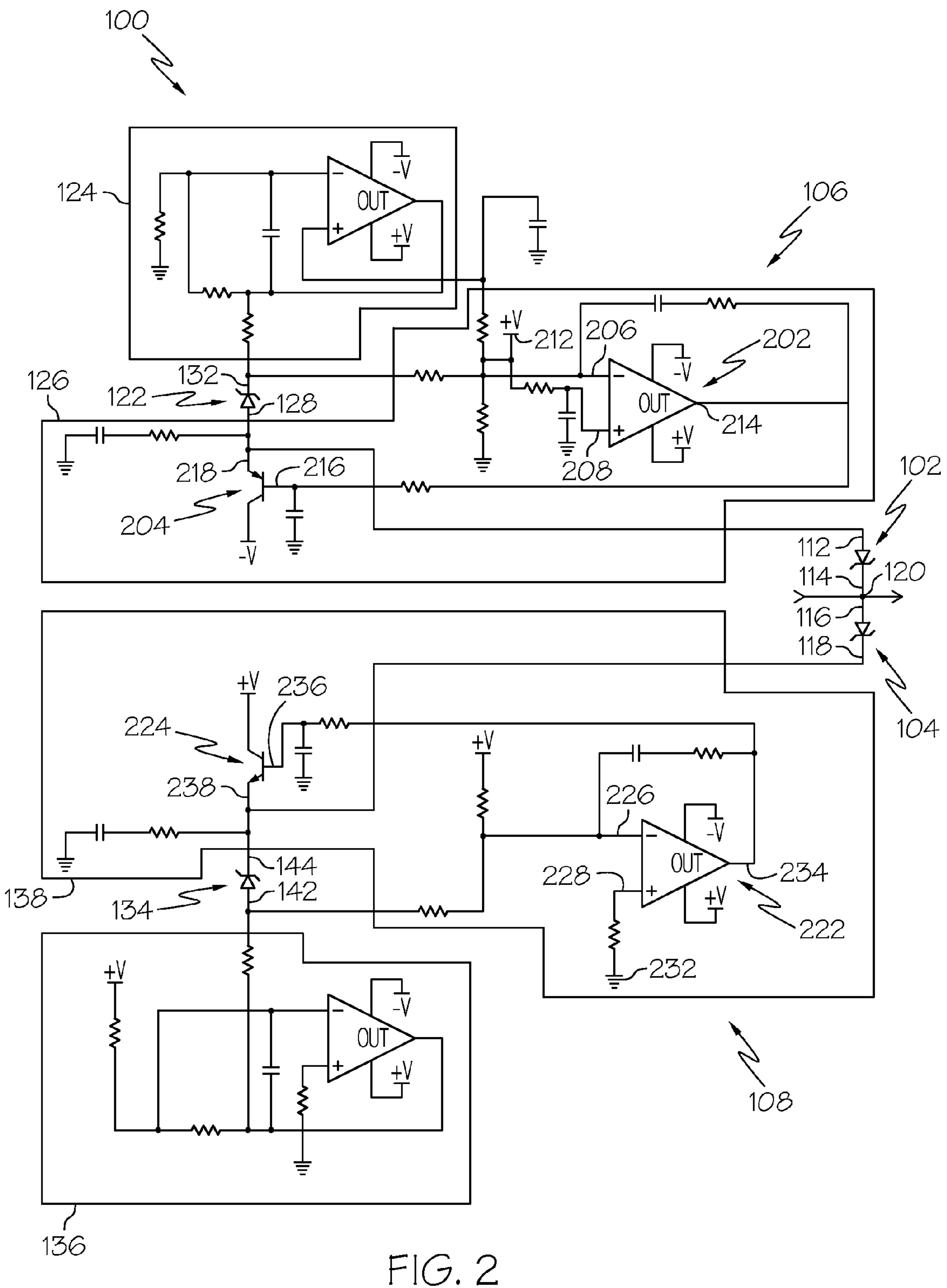
FIG. 2 depicts a schematic diagram of one particular implementation of the functional circuit depicted in FIG. 1.

The first and second offset clamp voltage regulator circuits 106, 108, and more specifically, the first and second current sources 124, 136, and the first and second voltage regulators 126, 138, may be variously configured to implement the functions described above. One embodiment of the high precision clipping regulator circuit 100, illustrating particular physical implementations of the first and second offset clamp voltage regulator circuits 106, 108, is depicted in FIG. 2. It will be appreciated that the specific values of each of the depicted components is not illustrated, as such values may be chosen to meet desired operational and/or functional needs. In the depicted embodiment, the first and second current sources 124, 136, are each implemented using well-known operational amplifier circuit configurations.

It is additionally seen that the depicted first and second voltage regulators 126, 138 are each implemented using generally well-known operational amplifier circuit configurations. In particular, the first voltage regulator 126 includes a first operational amplifier 202 and a first low impedance clamping transistor 204. The inverting input 206 of the first operational amplifier 202 is coupled to the third cathode 132, the non-inverting input 208 of the first operational amplifier 202 is coupled to a reference voltage source 212, and the output 214 of the first operational amplifier 202 is coupled to the base terminal 216 of the first low impedance clamping transistor 204. The emitter 218 of the first low impedance clamping transistor 204 is coupled to the third anode 128. With this configuration, the first operational amplifier 202, based on the voltage drop across the first reference diode 122, regulates the voltage at the base terminal 216 of the first low impedance clamping transistor 204, to thereby regulate the voltage on the emitter 218 of the first low impedance clamping transistor 204, which is the first variable offset clamp voltage.

The second voltage regulator 138 includes a second operational amplifier 222 and a second low impedance clamping transistor 224. The inverting input 226 of the second operational amplifier 222 is coupled to the fourth anode 142, the non-inverting input 228 of the second operational amplifier 222 is coupled to circuit common 232 (e.g., ground), and the output 234 of the second operational amplifier 222 is coupled to the base terminal 236 of the second low impedance clamping transistor 224. The emitter 238 of the second low impedance clamping transistor 224 is coupled to the fourth cathode 144. With this configuration, the second operational amplifier 222, based on the voltage drop across the second reference diode 134, regulates the voltage at the base terminal 236 of the second low impedance clamping transistor 224, to thereby regulate the voltage on the emitter 228 of the second low impedance clamping transistor 224, which is the second variable offset clamp voltage.

To provide an illustrative example, in one particular implementation the first and second protection diodes 102, 104, and thus the first and second reference diodes 122, 134, are selected so that each has a nominal protection voltage magnitude of 6.8 VDC. That is, each of these diodes 102, 104, 122, 134 conducts when the voltage potential between their respective anodes and cathodes nominally exceeds 6.8 VDC. For this particular implementation, the first offset clamp voltage regulator circuit 106 is configured such that the first variable offset clamp voltage supplied to the first anode 112 is nominally −1.725 VDC, and the second offset clamp voltage regulator circuit 108 is configured such that the second variable offset clamp voltage supplied to the second cathode 118 is nominally +6.725 VDC. Thus, the first protection diode 102 will conduct if the voltage at the protection node 120 reaches or exceeds 5.075 VDC, and the second protection diode will conduct if the voltage at the protection node 120 drops below (e.g., goes "more negative than") −0.075 VDC.

During operation of the circuit 100, assume that the temperature of the first protection diode 102 causes its protection voltage magnitude to increase to 6.9 VDC. Because the first reference diode 122 is substantially identical to, and is subject to the same temperature variations as, the first protection diode 102, the protection voltage magnitude of the first reference diode 122 will also increase to 6.9 VDC. As a result, the first operational amplifier 202 will vary the voltage at the base terminal 216 of the first low impedance clamping transistor 204, so that the voltage on the emitter 218 of the first low impedance clamping transistor 204, and thus the first variable offset clamp voltage, is now −1.825 VDC. Thus, the difference in voltage between the first anode 112 and the protection node 120, should the first protection diode conduct 102, will still be +5.075 VDC.

The high precision clipping regulator circuit and method disclosed herein protects highly accurate electronic circuits and systems from various postulated worst-case scenarios, while simultaneously allowing the electronic circuits and systems to operate at maximum precision.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A high precision clipping regulator circuit, comprising:

a first protection diode having a first anode and a first cathode, the first protection diode configured to conduct when a voltage potential between the first anode and first cathode exceeds a first protection voltage magnitude, the first protection diode operable to exhibit variations in the first protection voltage magnitude;

a second protection diode having a second anode and a second cathode, the second anode connected to the first cathode to define a protection node, the second protection diode configured to conduct when the voltage potential between the second anode and the second cathode exceeds a second protection voltage magnitude, the second protection diode operable to exhibit variations in the second protection voltage magnitude;

a first offset clamp voltage regulator circuit coupled to the first anode and configured to supply a first variable offset clamp voltage thereto, the first offset clamp voltage regulator circuit configured to determine when the first protection voltage varies and, in response thereto, to vary the first variable offset clamp voltage so that a difference in voltage between the first anode and the protection node, when the first protection diode conducts, remains substantially constant; and a second offset clamp voltage regulator circuit coupled to the second cathode and configured to supply a second variable offset clamp voltage thereto, the second offset clamp voltage regulator circuit configured to determine when the second protection voltage varies and, in response thereto, to vary the second variable offset clamp voltage so that a difference in voltage between the second cathode and the protection node, when the second protection diode conducts, remains substantially constant.

2. The circuit of claim 1, wherein the first and second protection diodes are each zener diodes.

3. The circuit of claim 1, wherein the first and second protection diodes are each conventional diodes.

4. The circuit of claim 1, wherein the first offset clamp voltage regulator circuit comprises a first reference diode substantially identical to the first protection diode and having a third anode and a third cathode, the first reference diode configured to conduct when a voltage potential between the third anode and third cathode exceeds the first protection voltage magnitude, the first reference diode operable to exhibit variations in the first protection voltage magnitude substantially identical to those of the first protection diode.

5. The circuit of claim 4, wherein the first reference diode is a zener diode.

6. The circuit of claim 4, wherein the first offset clamp voltage regulator further comprises a first constant current source coupled to the third cathode and configured to supply a constant current through the first reference diode.

7. The circuit of claim 4, wherein the first offset clamp voltage regulator further comprises a first voltage regulator circuit coupled to the third cathode and configured to:

(i) supply the first variable offset clamp voltage, (ii) sense variations in the first protection voltage magnitude, and (iii) vary the first variable offset clamp voltage in response to sensed variations in the first protection voltage magnitude.

8. The circuit of claim 1, wherein the second offset clamp voltage regulator circuit comprises a second reference diode, the second reference diode substantially identical to the second protection diode and having a fourth anode and a fourth cathode, the second reference diode configured to conduct when a voltage potential between the fourth anode and fourth cathode exceeds the second protection voltage magnitude, the second reference diode operable to exhibit variations in the second protection voltage magnitude substantially identical to those of the second protection diode.

9. The circuit of claim 8, wherein the second reference diode is a zener diode.

10. The circuit of claim 8, wherein the second offset clamp voltage regulator further comprises a second constant current source coupled to the fourth anode and configured to supply a constant current through the second reference diode.

11. The circuit of claim 8, wherein the second offset clamp voltage regulator further comprises a first voltage regulator circuit coupled to the fourth anode and configured to:

(i) supply the second variable offset clamp voltage, (ii) sense variations in the second protection voltage magnitude, and (iii) vary the second variable offset clamp voltage in response to sensed variations in the second protection voltage magnitude.

12. The circuit of claim 1, further comprising:

a plurality of additional first protection diodes each having a first anode and a first cathode, each of the additional first protection diodes configured to conduct when a voltage potential between its first anode and first cathode exceeds the first protection voltage magnitude, each of the additional first protection diodes operable to exhibit variations in the first protection voltage magnitude, and each of the first anodes of the additional first protection diodes coupled to receive the first variable offset clamp voltage from the first offset clamp voltage regulator circuit;

a plurality of additional second protection diodes each having a second anode and a second cathode, each of the second anodes of the additional second protection diodes connected to the first cathode of a different one of the additional first protection diodes to define a plurality of additional protection nodes, each of the additional second protection diodes configured to conduct when a voltage potential between its second anode and second cathode exceeds the second protection voltage magnitude, each of the additional second protection diodes operable to exhibit variations in the second protection voltage magnitude.

13. A method of providing precision protection to a circuit, comprising the steps of:

electrically connecting a first protection diode to an input of the circuit, the first protection diode having a first anode and a first cathode, the first cathode connected to the input of the circuit, the first protection diode configured to conduct when a voltage potential between the first anode and first cathode exceeds a first protection voltage magnitude, the first protection diode operable to exhibit variations in the first protection voltage magnitude;

electrically connecting a second protection diode to the input of the circuit, the second protection diode having second anode and a second cathode, the second anode connected to the input of the circuit, the second protection diode configured to conduct when a voltage potential between the second anode and second cathode exceeds a second protection voltage magnitude, the second protection diode operable to exhibit variations in the second protection voltage magnitude;

supplying a first variable offset clamp voltage to the first anode;

supplying a second variable offset clamp voltage to the second cathode;

determining when the first protection voltage varies and, in response thereto, varying the first variable offset clamp voltage so that a difference in voltage between the first anode and the input of the circuit, when the first protection diode conducts, remains substantially constant; and determining when the second protection voltage varies and, in response thereto, varying the second variable offset clamp voltage so that a difference in voltage between the second cathode and the input of the circuit, when the second protection diode conducts, remains substantially constant.

14. The method of claim 13, wherein the circuit comprises a plurality of additional inputs, and wherein the method further comprises:

connecting a plurality of additional first protection diodes, one each, to a different one of the plurality of additional inputs, each of the additional first protection diodes having a first anode and a first cathode, each of the additional first protection diodes configured to conduct when a voltage potential between its first anode and first cathode exceeds the first protection voltage magnitude, each of the additional first protection diodes operable to exhibit variations in the first protection voltage magnitude;

supplying the first variable offset clamp voltage to each of the first anodes of the additional first protection diodes;

connecting a plurality of additional second protection diodes, one each, to a different one of the plurality of additional inputs, each of the additional second protection diodes having a second anode and a second cathode, each of the additional second anodes of the additional second protection diodes connected to the first cathode of a different one of the additional first protection diodes, each of the additional second protection diodes configured to conduct when a voltage potential between its second anode and second cathode exceeds the second protection voltage magnitude, each of the additional second protection diodes operable to exhibit variations in the second protection voltage magnitude; and supplying the second variable offset clamp voltage to each of the second cathodes of the additional second protection diodes.

15. A high precision clipping regulator circuit, comprising:

a first protection zener diode having a first anode and a first cathode, the first protection zener diode configured to conduct when a voltage potential between the first anode and first cathode exceeds a first protection voltage magnitude, the first protection zener diode operable to exhibit variations in the first protection voltage magnitude;

a second protection zener diode having a second anode and a second cathode, the second anode connected to the first cathode to define a protection node, the second protection zener diode configured to conduct when the voltage potential between the second anode and the second cathode exceeds a second protection voltage magnitude, the second protection zener diode operable to exhibit variations in the second protection voltage magnitude;

a first offset clamp voltage regulator circuit coupled to the first anode; and a second offset clamp voltage regulator circuit coupled to the second cathode, wherein the first offset clamp voltage regulator circuit comprises:

a first reference zener diode substantially identical to the first protection zener diode and having a third anode and a third cathode, the first reference zener diode configured to conduct when a voltage potential between the third anode and third cathode exceeds the first protection voltage magnitude, the first reference zener diode operable to exhibit variations in the first protection voltage magnitude substantially identical to those of the first protection zener diode, a first constant current source coupled to the third cathode and configured to supply a constant current through the first reference zener diode, and a first voltage regulator circuit coupled to the third cathode and configured to (i) supply the first variable offset clamp voltage, (ii) sense variations in the first protection voltage magnitude, and (iii) vary the first variable offset clamp voltage in response to sensed variations in the first protection voltage magnitude so that a difference in voltage between the first anode and the protection node, when the first protection zener diode conducts, remains substantially constant, and wherein the second offset clamp voltage regulator circuit comprises:

a second reference zener diode substantially identical to the second protection zener diode and having a fourth anode and a fourth cathode, the second reference zener diode configured to conduct when a voltage potential between the fourth anode and fourth cathode exceeds the second protection voltage magnitude, the second reference zener diode operable to exhibit variations in the second protection voltage magnitude substantially identical to those of the first protection zener diode, a second constant current source coupled to the fourth anode and configured to supply a constant current through the second reference zener diode, and a second voltage regulator circuit coupled to the fourth anode and configured to (i) supply the second variable offset clamp voltage, (ii) sense variations in the second protection voltage magnitude, and (iii) vary the second variable offset clamp voltage in response to sensed variations in the second protection voltage magnitude so that a difference in voltage between the second cathode and the protection node, when the second protection diode conducts, remains substantially constant.

* * * * *